United States Patent [19]

Stires, Jr.

[11] Patent Number: 4,836,173

[45] Date of Patent: Jun. 6, 1989

[54] FUEL VAPORIZATION DEVICE FOR AN INTERNAL COMBUSTION ENGINE

[76] Inventor: Sylvester Stires, Jr., 9405 Elm Ave., Fontana, Calif. 92335

[21] Appl. No.: 170,894

[22] Filed: Mar. 21, 1988

[51] Int. Cl.[4] .............................................. F02M 17/22
[52] U.S. Cl. ..................................... 123/522; 123/557
[58] Field of Search ................. 123/557, 543, 522, 523

[56] References Cited

U.S. PATENT DOCUMENTS

| | | | |
|---|---|---|---|
| 2,882,882 | 4/1959 | Pantano | 123/557 |
| 3,854,463 | 12/1974 | Burden, Sr. | 123/557 |
| 3,931,801 | 1/1976 | Rose et al. | 123/557 |
| 4,015,570 | 4/1977 | Sommerville | 123/557 |
| 4,196,710 | 4/1980 | Lehar | 123/557 |
| 4,267,802 | 5/1981 | Garretson | 123/523 |
| 4,274,383 | 6/1981 | Adams | 123/523 |
| 4,276,864 | 7/1981 | Waschkuttis | 123/557 |
| 4,294,219 | 10/1981 | Rowe | 123/557 |
| 4,312,317 | 1/1982 | Jewett et al. | 123/557 |
| 4,333,422 | 6/1982 | Mahoney | 123/557 |
| 4,336,783 | 6/1982 | Henson | 123/557 |
| 4,350,134 | 9/1982 | Sparks | 123/557 |
| 4,356,805 | 11/1982 | Kler | 123/557 |
| 4,409,946 | 10/1983 | Sandford | 123/557 |
| 4,422,429 | 12/1983 | Reed | 123/557 |
| 4,448,175 | 5/1984 | Darvial | 123/557 |
| 4,476,841 | 10/1984 | Duckworth | 123/557 |

*Primary Examiner*—E. Rollins Cross
*Attorney, Agent, or Firm*—John H. Crowe

[57] ABSTRACT

A device attachable to an internal combustion engine for a motor vehicle having the usual carburetor, air filter and air filter housing, intake manifold, radiator through which an engine coolant is circulated when the engine is running and a source of liquid fuel for the engine. The device includes a fuel vaporizing chamber adapted to fit against the air filter housing and contain a body of the fuel at a predetermined level. The fuel vaporizing chamber is fitted with fluid flow lines for air, engine coolant and engine fuel so arranged and tied in with the engine components to route air into the body of fuel in the chamber and release the air under the surface of the fuel to bubble upwardly and pick up vaporized fuel; route engine coolant through the body of fuel to heat it; route fuel from the engine's fuel source through the body of heated fuel to heat the routed fuel, then route this heated fuel to the carburetor; and route a mixture of fuel vapor enriched air from above the body of liquid fuel in the vaporizing chamber to the intake manifold of the engine where it mixes with an air-fuel mixture from the carburetor.

10 Claims, 2 Drawing Sheets

FUEL VAPORIZATION DEVICE FOR AN INTERNAL COMBUSTION ENGINE

BACKGROUND OF THE INVENTION

1. Field of the Invention

This invention relates to internal combustion engines and more particularly to an apparatus for vaporizing hydrocarbon liquid fuels of the type conventionally used for the powering of such engines.

2. Description of the Prior Art

Carburetors are typically used to atomize a liquid fuel to form a air-fuel mixture of suitable character to be fed into the combustion chambers in the piston cylinders of such engines, where it is ignited.

The efficiency of such an engine is, at least in part, dependent upon the degree to which the fuel is vaporized and it is well known that with conventional carburetors, the fuel is not completely vaporized under all conditions of operation. In many cases, the mixture of fuel and air flows through the intake manifold and into the combustion chambers of the engine as a wet mist in which minute droplets or globules of liquid fuel exist, whereas, ideally, the mixture should be vaporized into a dry explosive gas.

Heretofore, considerable research has been expended in attempts to improve vaporization by preheating the liquid fuel and/or heating the carbureted gaseous fuel prior to its passage into the combustion chambers. Although such attempts have met with limited success, they have had inherent disadvantages which have prevented them from being universally adopted.

While such prior art expedients may have improved engine performance and fuel economy to some extent, they have generally been found to be expensive to manufacture, are relatively complicated, and are inefficient under at least certain operating conditions. Further, most such devices of which I am aware, take up a considerable amount of space, thus making it impractical to incorporate them into existing motor vehicles of the like where engine space is generally at a premium.

SUMMARY OF THE INVENTION

A principal object of the present invention is to provide a fuel vaporization device which overcomes the above-noted disadvantages of prior devices of this type.

Another object is to provide such a device which considerably improves the performance and reduces the fuel consumption of an internal combustion engine.

Another object is to improve the combustion of fuel in motor vehicles and thereby reduce air pollution.

A further object is to provide a fuel vaporizing device which is of such small size that it can be easily and readily installed on an existing engine and located within the available space in the engine compartment of the vehicle in which the engine is mounted.

A further object is to provide a fuel vaporizing device which is simple in design and has virtually no moving parts.

A still further object is to provide a fuel vaporizing device which is highly reliable and yet inexpensive to manufacture, safe, and easily installable on an existing engine without the need of a highly skilled mechanic or any special tools.

The device of the present invention comprises an enclosed vaporizing chamber containing a body of heated liquid fuel which is maintained at a constant level. A heating tube, through which a heating fluid is passed, is partly immersed in the liquid fuel and extends partly in the space within the chamber above the fuel to maintain the fuel and the air space thereabove at an elevated temperature. A liquid fuel line for conveying fuel to the carburetor is also immersed in the body of fuel to receive heat therefrom and thus enhance the atomizing action of the carburetor.

Air under pressure, and preferably heated, is fed through a perforated tube submerged in the body of fuel in the vaporizing chamber, causing the air to bubble or percolate upwardly to the surface while absorbing fuel vapor which collects in the upper part of the chamber. Since this fuel vapor is picked up by the air bubbling through the heated fuel instead of by the spraying process normally used in a carburetor, the vaporized fuel-air mixture becomes highly oxygenated and thus highly combustible. An additional line conveys the oxygenated mixture, which is pressurized, from the upper portion of the vaporizing chamber to the entrance of the intake manifold where it mixes with the gaseous mixture coming from the carburetor. During this mixing process, the hot, dry vaporized fuel from the vaporizing chamber tends to break down any fuel droplets in the atomized fuel-air mixture from the carburetor.

BRIEF DESCRIPTION OF THE DRAWINGS

The manner in which the above-noted and other objects of the invention are accomplished will be readily understood from the following specification considered in conjunction with the accompanying drawings, wherein:

FIG. 2 is a sectional plan view taken substantially along line 3—3 of FIG. 2.

FIG. 4 is a transverse sectional view taken along line 5—5 of FIG. 3.

DESCRIPTION OF THE PREFERRED EMBODIMENT

Figure 1:
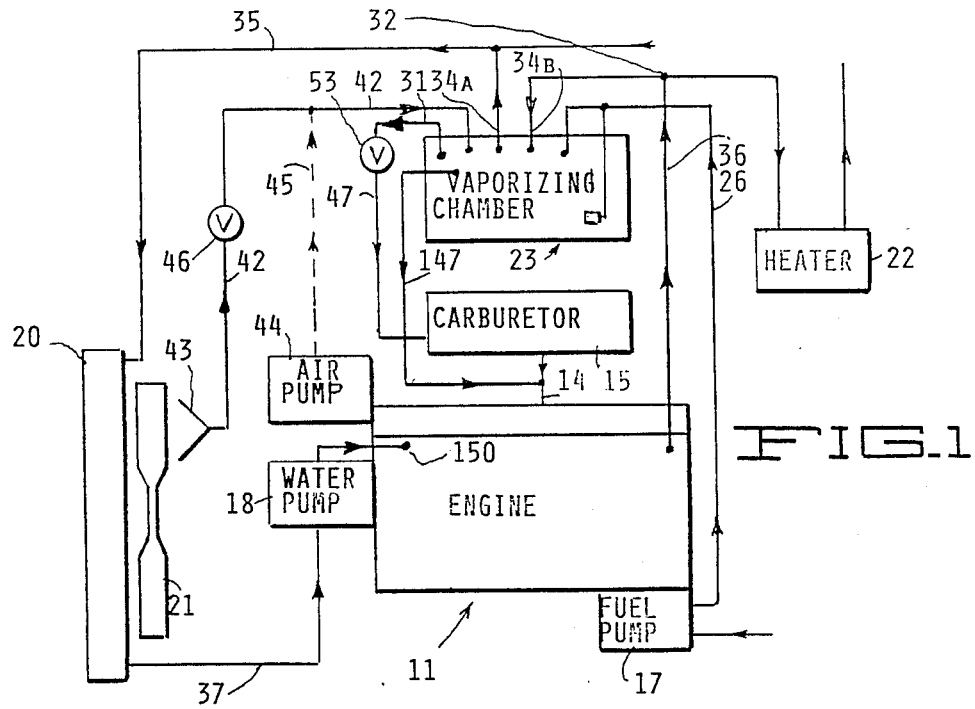
FIG. 1 is a schematic view showing the interrelationship of the apparatus of the present invention with a conventional internal combustion engine.

While this invention is susceptible to embodiment in many different forms, there is shown in the drawings and will be described herein one embodiment, with the understanding that the present disclosure is to be considered as an exemplification of the principles of the invention and is not intended to be limited to that embodiment. The scope of the invention will be limited only by the reach of the language of the appended claims.

Figure 2:
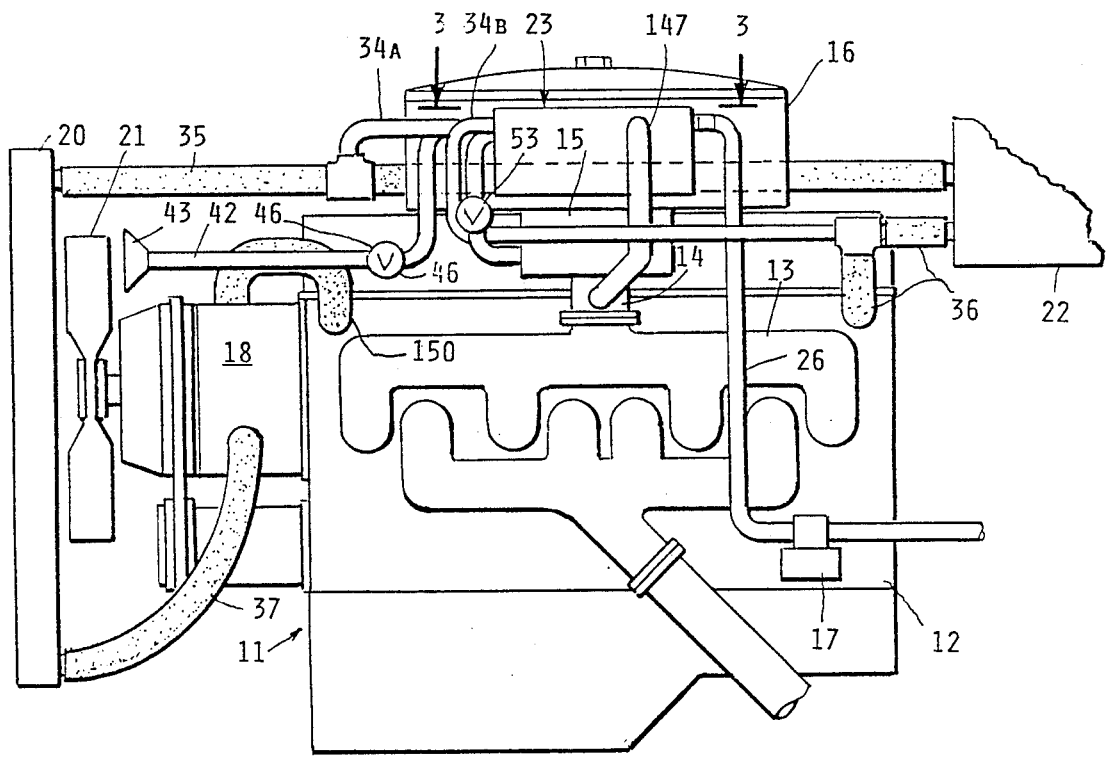
FIG. 2 is a side elevational view of the engine and a preferred embodiment of the apparatus of the present invention.
Figure 3:
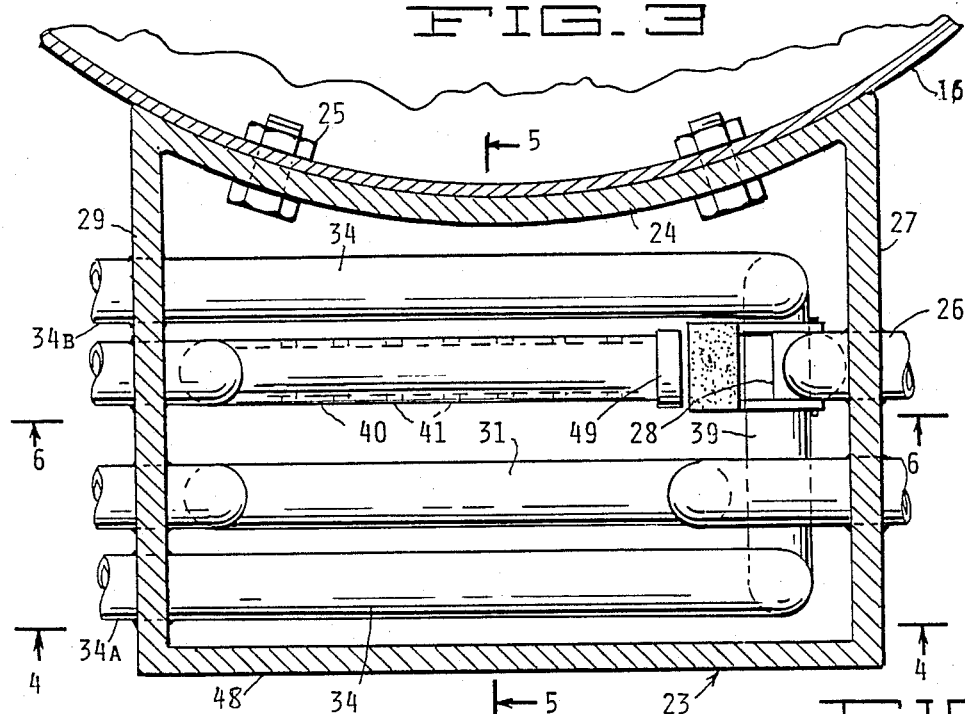

Referring first to FIG. 1 and 2, my invention is there shown in conjunction with a typical internal combustion engine, generally indicated at 11, such as found in most automobiles.

The engine includes an engine block 12 having an intake manifold 13. A downdraft carburetor 15 of conventional construction is connected to the intake 14 of the manifold and has an air filter housing 16 which contains a suitable air filter (not shown).

Among the engine accessories are a fuel pump 17, a water pump 18, a water radiator 20, a cooling fan 21, and a water heater 22. The engine and its various accessories are well known in the art so the details will not be described herein.

According to the invention, a vaporizing chamber 23 (FIG. 2 to 6) is provided. The chamber has a generally box-shaped body with an arcuate side wall 24 shaped to fit against the side of the air filter housing 16 and secured thereto by nuts and bolts 25. I have discovered that although most engine compartments, especially in modern day motor vehicles, are closely confined, there is usually room to install the vaporizing chamber against the side of the air filter housing in some position therearound. Vaporizing chamber 23 is normally closed and sealed by means of a lid 124 secured thereto by screws 19.

Liquid fuel, such a gasoline, is drawn from a suitable supply tank and forced by the fuel pump 17 through a fuel line tube 26 extending through the rear wall 27 of the vaporizing chamber, near its upper end. The tube 26 terminates in a float controlled valve 28 which permits the fuel to fill the chamber to a level indicated at 30 and to maintain the fuel at that level.

Figure 4:
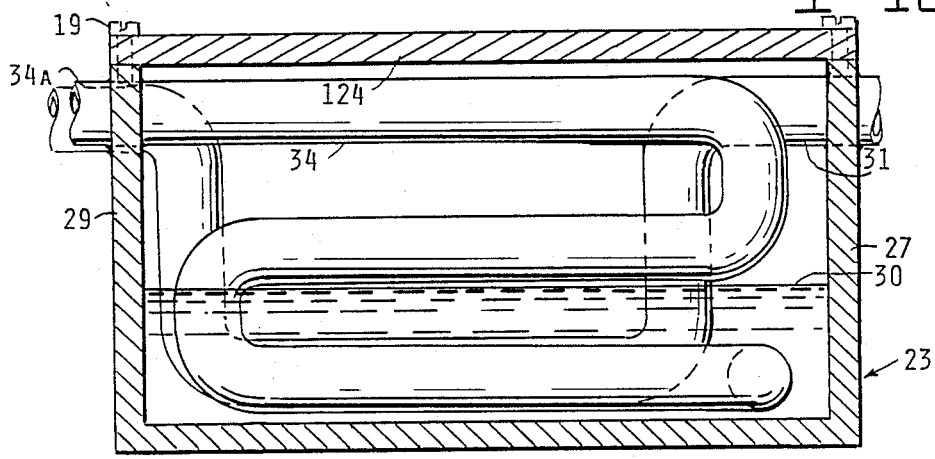
FIG. 4 is a longitudinal sectional view taken along line 4—4 of FIG. 3.
Figure 5:
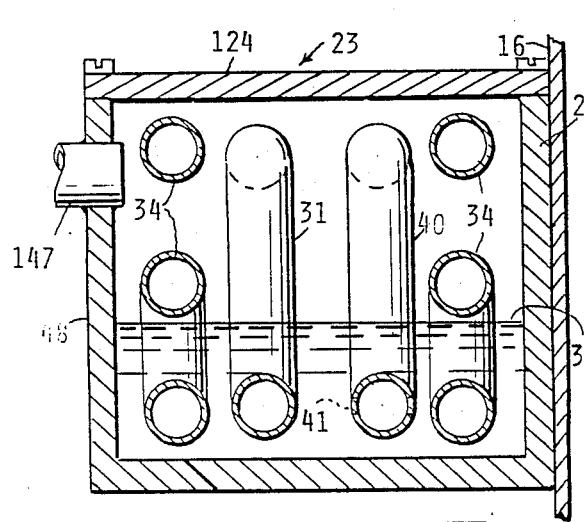
Figure 6:
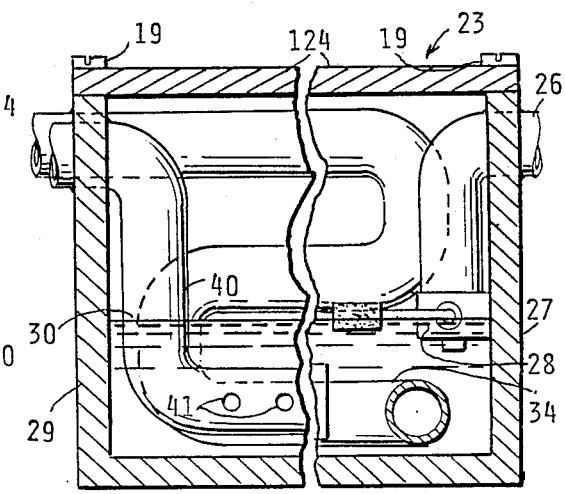
FIG. 6 is a longitudinal sectional view, partly broken away, taken along line 6—6 of FIG. 3.

A second fuel line or tube 31, preferably of a material such as copper having a relatively high degree of heat conductivity, is joined to the tube 25 through a t connection shown diagrammatically at 32 (FIG. 1). The fuel line 31 enters the chamber near its upper end, as seen in FIG. 4, to prevent possible leakage of fuel from the chamber body, and is then submerged below the fuel level 30 to permit the transfer of heat from the fuel body to the liquid fuel therein. The opposite end of tube 31 is bent upward to pass through the front wall 29 of the chamber near its upper end where it is connected to a line 47 leading to the fuel inlet of the carburetor 15.

Means are provided to continuously heat both the body of fuel in the chamber 23 and the space thereabove during operation of the engine. For this purpose, a heating tube 34, also preferably of copper or the like, is passed through the front wall 29 of the chamber 23, near its upper end and adjacent a side wall 48. The tube 34 is bent in a sinuous form to a position submerged below the level 30 of the fuel in the chamber. The tube 34 is then bent laterally to extend across the width of the chamber, as seen at 39, and is again bent in a sinuous form to exit through the front wall 29 near its upper end.

One end 34A of the heating tube 34 is connected to a line 35 leading from the heater 22 to the upper intake end of the radiator 20. The other end 34B of the heating tube 34 is connected to a line 36 leading from a coolant exit passage in the engine block. The line 36 also branches to the inlet end of the heater 22.

Coolant fluid flows downwardly through the radiator 20, then is drawn through a line 37 by the water pump 18 to an inlet passage 150 in the engine block 12. The coolant is heated during its passage through the block and is therefore fed at an elevated temperature through line 36 and tube 34 to maintain the body of liquid fuel in the chamber 23, as well as the space thereabove, at an elevated temperature. Thus, liquid fuel passing through the tube 31 to the carburetor is also heated.

An air tube 40 is also mounted in the chamber 23 and is maintained submerged blow the fuel level 30 for most of its length. This tube is closed at its end by a cap 49 but has a series of perforations 41 formed along its submerged length. Tube 40 is connected through a line 42 to an air scoop 43 located behind the fan 21. Thus, during operation of the engine, air heated by passage through the radiator 20 will be rammed under pressure through line 42 and tube 40 to emerge as air jets into the body of fuel in the chamber 23. The heated air thus forms bubbles which absorb some of the fuel in the form of vapor and this rises to the open space in the upper part of the chamber. If desired, the closed end of the tube 40 may be bent upwardly to terminate above the fuel level 30. A valve 46 is provided in the line 42 to regulate the flow of air to the chamber 23, as desired. Additionally, air under pressure may, if desired, be forced through the line 42 by an air pump 44 driven by the engine and connected by a line 45 to line 42.

A vacuum line 147 (FIG. 1, 2 and 5) opens into the upper part of side wall 48 of the chamber 23 and is connected at its lower end to the entrance 14 of the intake manifold 13 to convey the heated and vaporized fuel from the chamber 23 to admixture with the air-fuel mixture passing downwardly from the carburetor where it more completely vaporizes the latter mixture before it passes through the intake manifold.

As a safety feature, it will be noted that all of the lines leading to and from the chamber 23 are located above the level 30 of the body of fuel to thereby moot the possibility of leakage of fuel at the junctures of such lines and the walls of the chamber.

If desired, a valve 53 may be provided in the fuel line 31 leading to the carburetor so that under certain conditions, the carburetor may be bypassed, enabling the gaseous mixture from the chamber 23 to be used as the sole source of fuel to the intake manifold.

With obvious modifications the apparatus of this invention can be used with engines incorporating fuel injection devices in lieu of carburetors.

From the foregoing it will be appreciated that the device of the present invention provides a simple, compact, inexpensive and reliable vaporizing system which greatly improves engine performance, power and fuel economy, as well as reducing air pollution, by comparison with the performance of engines minus the device. This is evidenced by the fact that when I installed by novel fuel vaporizing system on a car I had driven for many years without it, I experienced a substantial decrease in fuel consumption under various speed and road conditions during 7,000 miles of travel. For example, I recently drove the car (a 1976 Ford Granada) fitted with the system for 115 miles and compared the mileage obtained on that trip with the mileage performance of the car when new and without the device. This comparison showed a remarkable increase of 156% in mileage over the highway mileage of the 11 year old car when it was brand new. During that test drive I drove the Granada mostly at highway speeds of from 70 to 85 miles per hour.

I claim:

1. Apparatus for improving the fuel economy and performance of an internal combustion engine having a fuel atomizing device for atomizing liquid fuel to be ignited by said engine and provided with a source of liquid fuel for said atomizing device, comprising:

an enclosed fuel vaporizing chamber;

means for maintaining a body of said liquid fuel in said vaporizing chamber at a predetermined level below an open space therein;

a heating tube extending below said predetermined level in said chamber;

means for conducting a heating fluid through said tube whereby to heat said body of liquid fuel;

means for injecting air into said body of liquid fuel whereby to form upwardly rising air bubbles which absorb the fuel in vaporized form to provide a source of air enriched with the vaporized fuel in said open space; and vacuum means for conveying the mixture of air and vaporized fuel from said chamber to admixture with the atomized fuel from said atomized device.

2. Apparatus for improving the fuel economy and performance of an internal combustion engine in accordance with claim 1 in which said internal combustion engine has an intake manifold; said heating tube extends partly below and partly above said predetermined level whereby to heat the body of fuel and the open space ins aid vaporizing chamber; and the means for conveying the mixture of air and vaporized fuel from said chamber conveys the mixture to said intake manifold.

3. Apparatus in accordance with claim 1 in which said fuel atomizing device is a carburetor and said intake manifold is adapted to receive atomized fuel and air from said carburetor.

4. Apparatus in accordance with claim 3 in which said internal combustion engine includes a filter for filtering air passing into said carburetor and a housing for said filter; said fuel vaporizing chamber is shaped to fit in mating engagement with said housing; and said apparatus includes means for securing said vaporizing chamber to said housing.

5. Apparatus in accordance with claim 4 wherein said means for injecting air into said body of fuel comprises a tube extending below the surface of said liquid fuel and having a plurality of perforations along its length.

6. Apparatus in accordance with claim 5 in which said engine is cooled by a circulating coolant when running and said heating fluid is said circulating coolant.

7. Apparatus in accordance with claim 6 including means for varying the flow of said air injected into said body of liquid fuel.

8. Apparatus in accordance with claim 7 including tube means for conveying liquid fuel from said source to said carburetor through said body of liquid fuel to thereby cause the conveyed fuel to be heated.

9. Apparatus in accordance with claim 8 in which said engine has a heat radiating device and a fan to pull air therethrough which is heated in the process, and in which said means for injecting air into said body of fuel in said fuel vaporizing chamber includes heated air pickup means in the vicinity of said fan.

10. Apparatus in accordance with claim 9 in which said heating tube extends partly through the open space in the vaporizing chamber to heat the mixture of air and fuel vapor therein.

* * * * *

UNITED STATES PATENT AND TRADEMARK OFFICE
CERTIFICATE OF CORRECTION

PATENT NO. : 4,836,173

DATED : June 6, 1989

INVENTOR(S) : SYLVESTER STIRES, JR.

It is certified that error appears in the above-identified patent and that said Letters Patent is hereby corrected as shown below:

Column 1, line 13, change "a" to --an--; and line 40, change "of" to --or--.
Column 2, line 39, change "2" to --3--; and line 43, change "4" to --5--.
Column 3, line 18, "a" after "such" should be --as--; line 27, change "t" to --T--; and line 66, "blow" should read --below--. Column 4, line 43, "by" after "installed" should read --my--. Column 5, lines 16 and 17, "ins aid" should be --in said--.

Signed and Sealed this

Twentieth Day of March, 1990

Attest:

JEFFREY M. SAMUELS

*Attesting Officer*  *Acting Commissioner of Patents and Trademarks*